US010034284B2

United States Patent
Lee et al.

(10) Patent No.: US 10,034,284 B2
(45) Date of Patent: Jul. 24, 2018

(54) METHOD FOR CONFIGURING REFERENCE RESOURCE OF CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/119,815

(22) PCT Filed: Mar. 10, 2015

(86) PCT No.: PCT/KR2015/002282
§ 371 (c)(1),
(2) Date: Aug. 18, 2016

(87) PCT Pub. No.: WO2015/137689
PCT Pub. Date: Sep. 17, 2015

(65) Prior Publication Data
US 2017/0064705 A1   Mar. 2, 2017

Related U.S. Application Data

(60) Provisional application No. 61/950,810, filed on Mar. 10, 2014.

(51) Int. Cl.
*H04W 72/04* (2009.01)
*H04L 5/14* (2006.01)
(Continued)

(52) U.S. Cl.
CPC ....... *H04W 72/0446* (2013.01); *H04L 1/0026* (2013.01); *H04L 1/0027* (2013.01);
(Continued)

(58) Field of Classification Search
CPC ....... H04L 1/00; H04L 1/0026; H04L 1/0027; H04L 5/001; H04L 5/0057; H04L 5/14;
(Continued)

(56) References Cited

U.S. PATENT DOCUMENTS 8,934,350 B2 *  1/2015  Chen .................... H04L 1/0026
                                                                 370/241
9,019,850 B2 *  4/2015  Chen .................... H04W 24/10
                                                                 370/252
(Continued)

FOREIGN PATENT DOCUMENTS

JP   2014519750    8/2014
WO   2012161914   11/2012
(Continued)

OTHER PUBLICATIONS

LG Electronics, "UCI for TDD-FDD carrier aggregation," 3GPP TSG-RAN WG1 #76, R1-140313, Feb. 2014, 4 pages.
(Continued)

*Primary Examiner* — Tri H Phan
(74) *Attorney, Agent, or Firm* — Lee, Hong, Degerman, Kang & Waimey

(57) ABSTRACT

Disclosed is a method for reporting, by a terminal, channel status information (CSI) on a frequency division duplex (FDD) secondary cell in a wireless communication system to which a carrier aggregation technique is applied. Specifically, the method comprises the steps of: configuring, as valid sub-frames for measuring the CSI, sub-frames in the FDD secondary cell which coincide with the position of downlink sub-frames or the position of special sub-frames
(Continued)

including a downlink resource of a predetermined length or more on a specific uplink/downlink sub-frame configuration of a time division duplex (TDD) primary cell; measuring the CSO in at least one of the valid sub-frames; and reporting the CSI to a network.

6 Claims, 10 Drawing Sheets

(51) Int. Cl.
  *H04W 24/08* (2009.01)
  *H04L 1/00* (2006.01)
  *H04L 5/00* (2006.01)
(52) U.S. Cl.
  CPC ............ *H04L 5/001* (2013.01); *H04L 5/0057* (2013.01); *H04L 5/14* (2013.01); *H04W 24/08* (2013.01)
(58) Field of Classification Search
  CPC ..... H04W 24/08; H04W 24/10; H04W 72/04; H04W 72/0446; H04B 17/24
  See application file for complete search history.

(56) References Cited

U.S. PATENT DOCUMENTS

| | | | | |
|---|---|---|---|---|
| 9,137,804 | B2* | 9/2015 | Lin | H04W 72/048 |
| 9,622,217 | B2* | 4/2017 | Xu | H04L 5/1469 |
| 9,860,880 | B2* | 1/2018 | Yokomakura | H04W 72/0413 |
| 9,912,430 | B2* | 3/2018 | Sayana | H04J 3/1694 |
| 2010/0329142 | A1* | 12/2010 | Hao | H04W 72/1284 |
| | | | | 370/252 |
| 2012/0257524 | A1 | 10/2012 | Chen et al. | |
| 2012/0300641 | A1 | 11/2012 | Chen et al. | |
| 2013/0039231 | A1* | 2/2013 | Wang | H04W 72/10 |
| | | | | 370/280 |
| 2013/0188516 | A1* | 7/2013 | He | H04W 28/16 |
| | | | | 370/254 |
| 2013/0315114 | A1* | 11/2013 | Seo | H04L 5/001 |
| | | | | 370/280 |
| 2014/0010126 | A1* | 1/2014 | Sayana | H04J 3/1694 |
| | | | | 370/280 |
| 2014/0126501 | A1* | 5/2014 | Pan | H04L 5/0032 |
| | | | | 370/329 |
| 2014/0334391 | A1* | 11/2014 | Khoshnevis | H04W 72/0413 |
| | | | | 370/329 |
| 2015/0319753 | A1* | 11/2015 | Chen | H04L 5/001 |
| | | | | 370/277 |
| 2016/0050706 | A1* | 2/2016 | Zhang | H04W 76/00 |
| | | | | 370/280 |
| 2017/0012757 | A1* | 1/2017 | Suzuki | H04W 72/1226 |

FOREIGN PATENT DOCUMENTS

| | | |
|---|---|---|
| WO | 2012175030 | 12/2012 |
| WO | 2014019239 | 2/2014 |

OTHER PUBLICATIONS

Texas Instruments, "General Aspects for Tdd-Fdd Carrier Aggregation," 3GPP TSG-RAN WG1 #75, R1-135248, Nov. 2013, 3 pages.
PCT International Application No. PCT/KR20151002282, Written Opinion of the International Searching Authority dated Jun. 19, 2015, 16 pages.
European Patent Office Application Serial Number 15760850.6, Search Report dated Oct. 9, 2017, 11 pages.
Samsung, "CSI feedback for TDD-FDD CA", 3GPP TSG RAN WG1 Meeting #76, R1-140361, Feb. 2014, 5 pages.
Asustek, "Correction of valid downlink subframe", 3GPP TSG RAN WG1 Meeting #73, R1-132682, May 2013, 7 pages.
Mediatek, "TDM UL transmission for TDD-FDD DL CA-capable UE with single transmitter", 3GPP TSG RAN WG1 Meeting #76, R1-140236, Feb. 2014, 4 pages.
NEC, "Remaining issues in TDD-FDD carrier aggregation system", 3GPP TSG RAN WG1 Meeting #76, R1-140485, Feb. 2014, 4 pages.
Texas Instruments, "Joint TDD-FDD Carrier Aggregation", 3GPP TSG RAN WG1 Meeting #74bis, R1-134274, Oct. 2013, 4 pages.
Intel, "Discussion on Signalling Mechanisms for TDD UL-DL Reconfiguration", 3GPP TSG RAN WG1 Meeting #172bis, R1-130916, Apr. 2013, 4 pages.

* cited by examiner (a) Control-Plane Protocol Stack (b) User-Plane Protocol Stack

METHOD FOR CONFIGURING REFERENCE RESOURCE OF CHANNEL STATE INFORMATION IN WIRELESS COMMUNICATION SYSTEM AND APPARATUS THEREFOR

TECHNICAL FIELD

The present invention relates to a wireless communication system, and more particularly, to a method of configuring a reference resource of channel state information in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

A technical task of the present invention is to propose a method of configuring a reference resource of channel state information in a wireless communication and an apparatus therefor based on the aforementioned discussion.

Technical Solution

To achieve these and other advantages and in accordance with the purpose of the present invention, as embodied and broadly described, according to one embodiment, a method of reporting CSI (channel status information) on a FDD (frequency division duplex) secondary cell, which is reported by a user equipment in a wireless communication system to which a carrier aggregation technique is applied, includes the steps of configuring subframes of the FDD secondary cell, which are matched with a position of downlink subframes of a specific uplink/downlink subframe configuration of a TDD (time division duplex) primary cell or a position of special subframes including a downlink resource longer than a predetermined length, as valid subframes for measuring the CSI, measuring the CSI from at least one of the valid subframes, and reporting the CSI to a network.

Preferably, the user equipment is unable to perform simultaneous transmission and reception in the TDD primary cell and the FDD secondary cell. Or, an uplink band of the FDD secondary cell is adjacent to a band of the TDD primary cell as much as equal to or less than a threshold. More preferably, the specific uplink/downlink configuration may correspond to an uplink/downlink subframe configuration configured in advance via system information.

The method can further include the step of detecting information on an uplink/downlink subframe configuration for dynamically changing a subframe usage in the TDD primary cell. In this case, if it fails to detect the information on the uplink/downlink subframe configuration, the specific uplink/downlink subframe configuration may correspond to an uplink/downlink subframe configuration configured in advance via system information.

To further achieve these and other advantages and in accordance with the purpose of the present invention, according to a different embodiment, a method of reporting CSI (channel status information) on a TDD (time division duplex) secondary cell, which is reported by a user equipment in a wireless communication system to which a carrier aggregation technique is applied, include the steps of configuring downlink subframes of a specific uplink/downlink subframe configuration of the TDD secondary cell or special subframes including a downlink resource longer than a predetermined length as valid subframes for measuring the CSI in the TDD secondary cell, measuring the CSI from at least one of the valid subframes, and reporting the CSI to a network.

Preferably, the user equipment is unable to perform simultaneous transmission and reception in a FDD (frequency division duplex) primary cell and the TDD secondary cell.

Or, an uplink band of a FDD (frequency division duplex) primary cell is adjacent to a band of the TDD secondary cell as much as equal to or less than a threshold.

More preferably, if uplink scheduling information on a specific subframe among the valid subframes in the FDD primary cell is received from the network, the scheduling information can be ignored. Or, the specific subframe can be excluded from the valid subframes.

In addition, the specific uplink/downlink subframe configuration may correspond to an uplink/downlink subframe configured in advance via system information or an uplink/downlink subframe configuration indicated via a physical layer.

On the contrary, the method can further include the step of detecting information on an uplink/downlink subframe configuration for dynamically changing a subframe usage in the TDD secondary cell. If it fails to detect information on the uplink/downlink subframe configuration, the specific uplink/downlink subframe configuration may correspond to an uplink/downlink subframe configuration configured in advance via system information.

Advantageous Effects

According to embodiments of the present invention, it is able to efficiently define a reference resource for measuring channel state information in a wireless communication system in which a usage of a radio resource is dynamically changing and more stably perform measurement of the channel state information.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
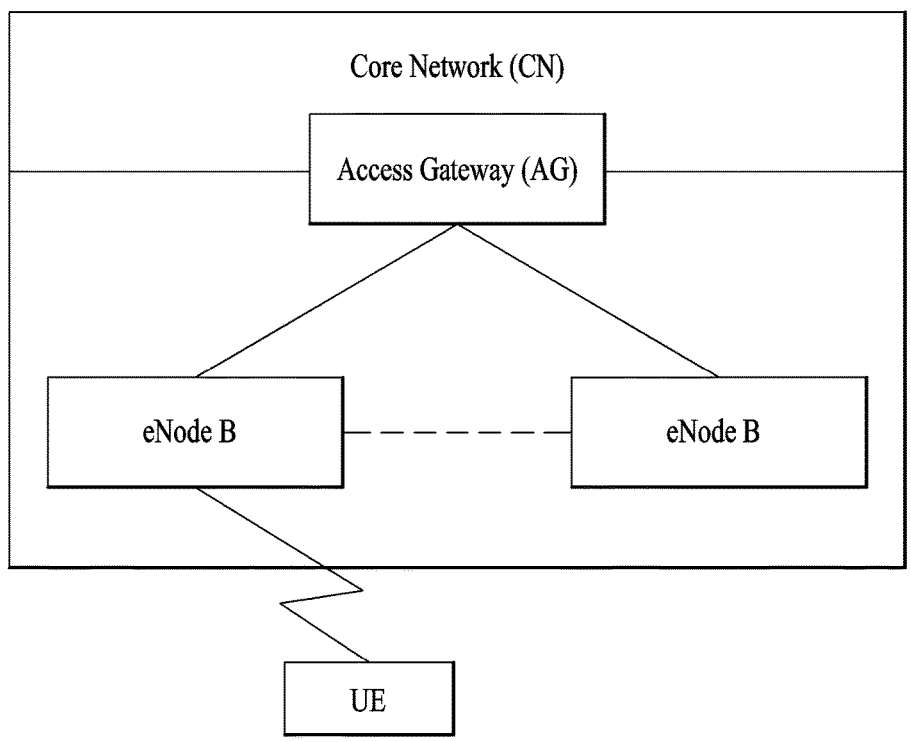
FIG. 1 is a schematic diagram of E-UMTS network structure as one example of a wireless communication system.
Figure 2:
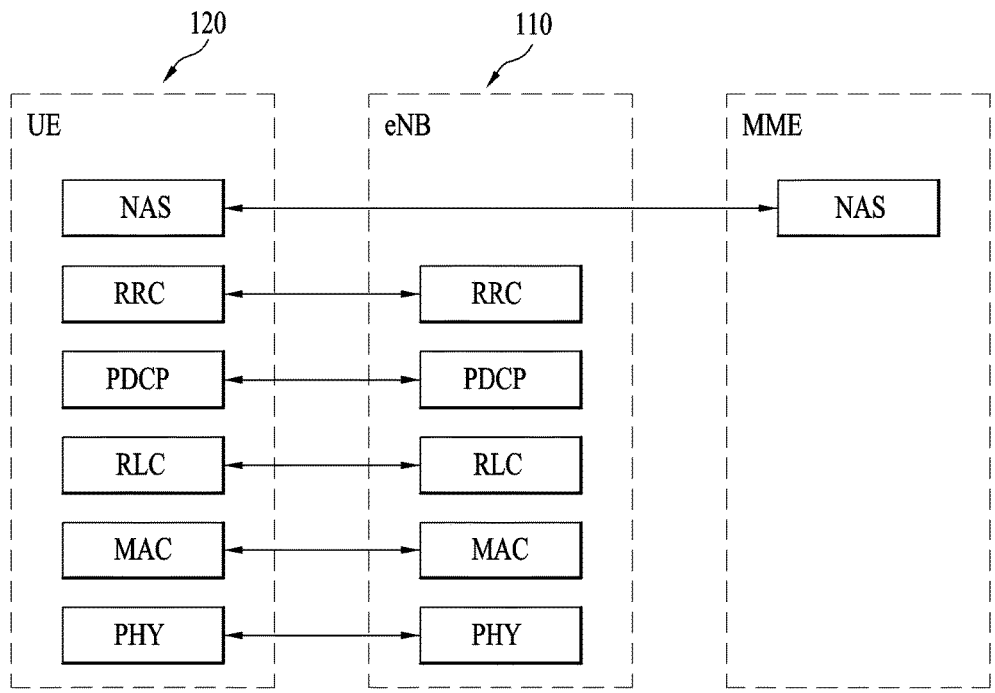
FIG. 2 is a diagram for structures of control and user planes of radio interface protocol between a 3GPP radio access network standard-based user equipment and E-UTRAN.
Figure 2:
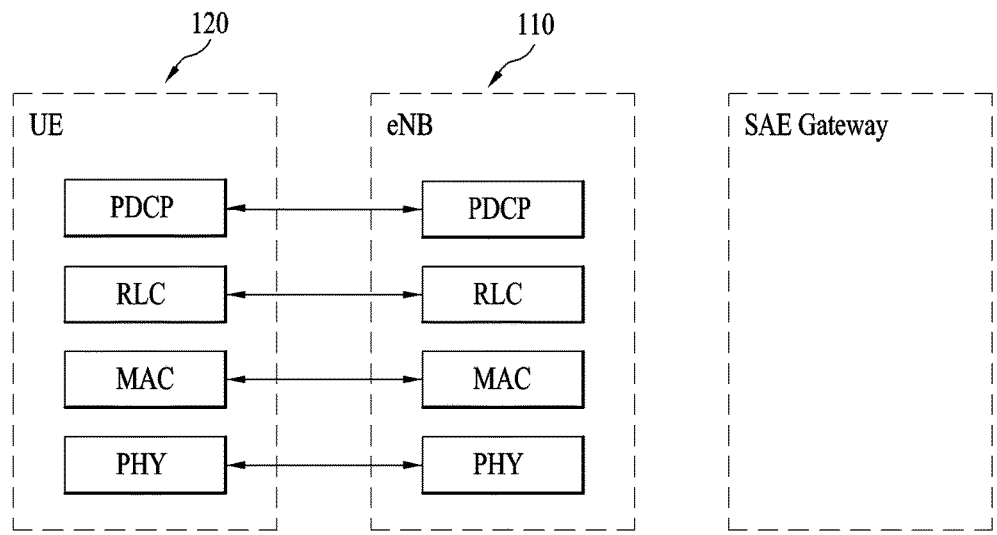

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
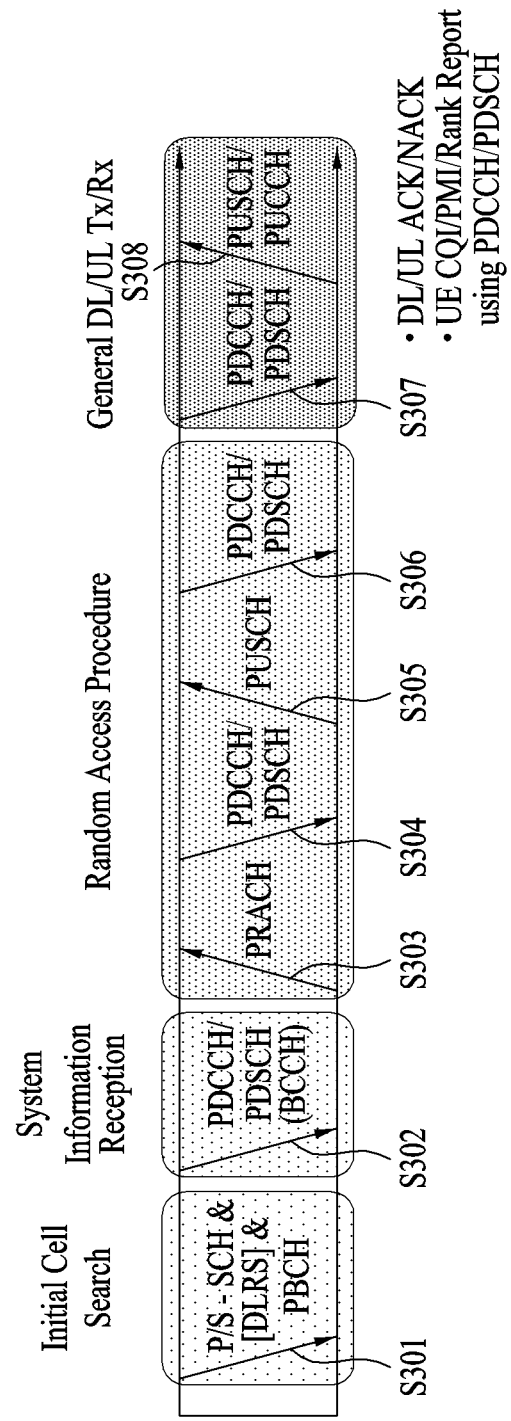
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
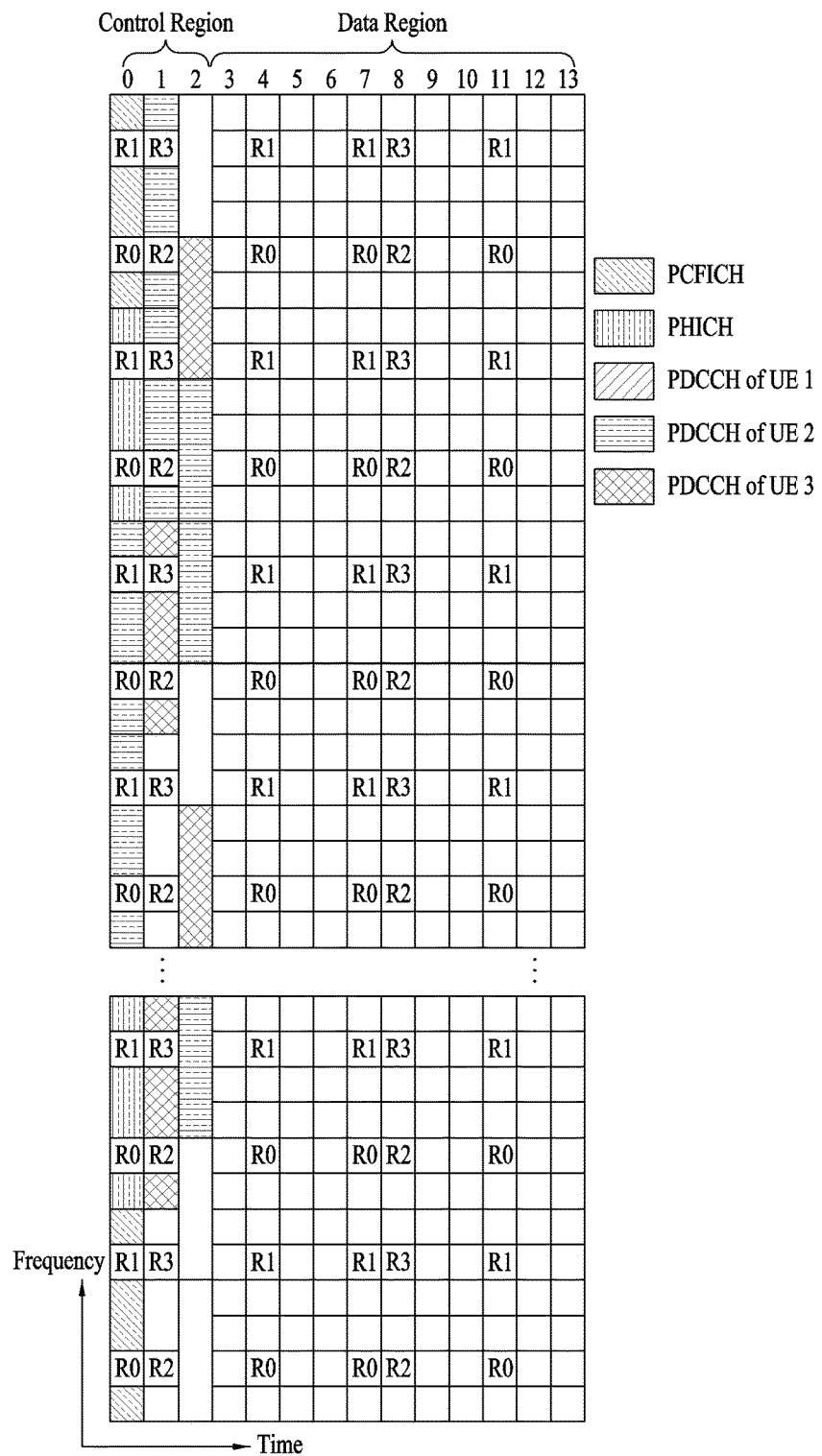
FIG. 4 is a diagram for a structure of a downlink radio frame in LTE system.

FIG. 4 is a diagram for showing an example of a control channel included in a control region of a single subframe in a DL radio frame.

Referring to FIG. 4, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 5:
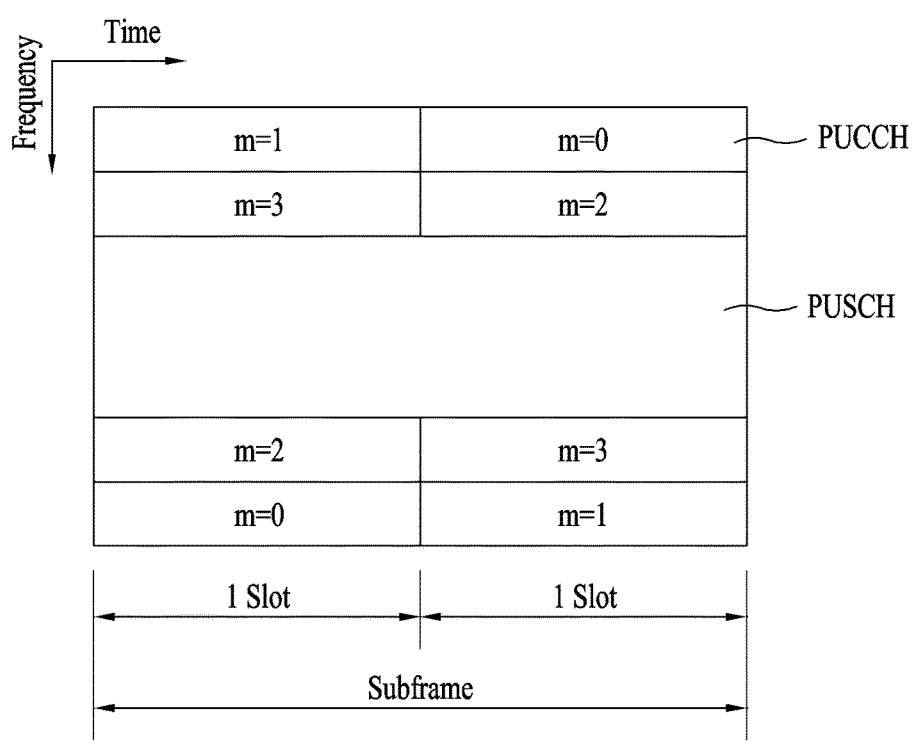
FIG. 5 is a diagram for a structure of an uplink radio frame in LTE system.

FIG. 5 is a diagram for a structure of an uplink radio frame in LTE system.

Referring to FIG. 5, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 5 shows an example that the PUCCHs satisfying conditions (e.g., m=0, 1, 2, 3) are assigned to a subframe.

And, time for transmitting a sounding reference signal in a subframe corresponds to a section at which a symbol located at the very last in a time axis is located and the sounding reference signal is transmitted via a data transmission band in frequency axis. Sounding reference signals of a plurality of user equipments, which are transmitted via the last symbol of an identical subframe, can be distinguished from each other according to a frequency position.

Figure 6:
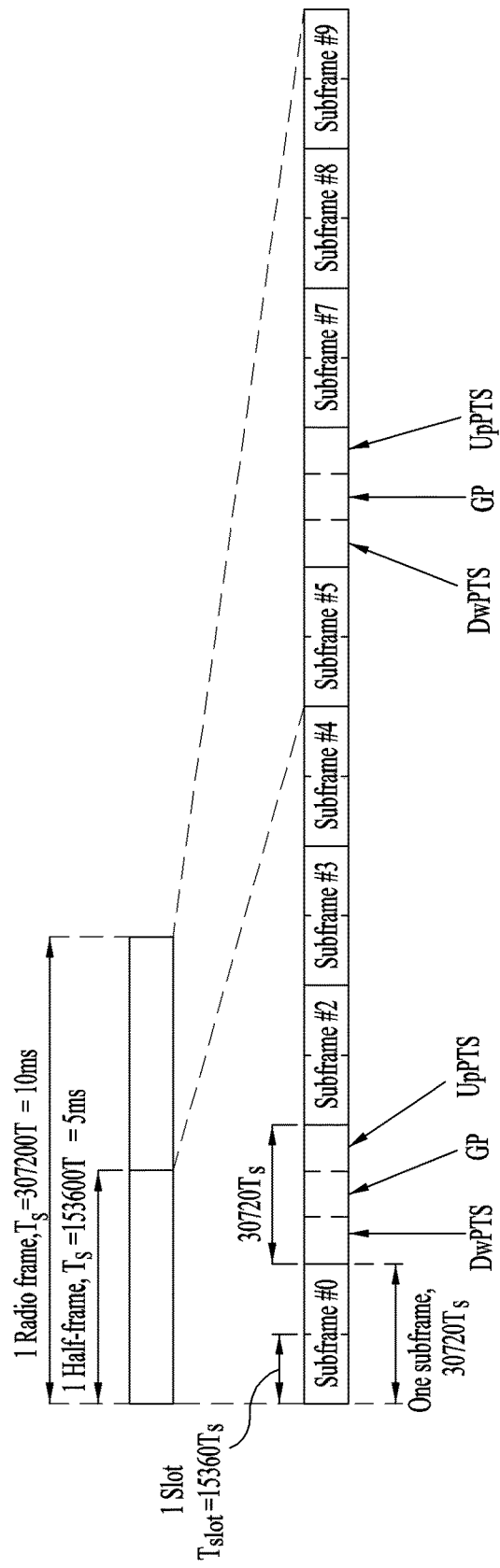
FIG. 6 is a diagram for an example of a radio frame structure in LTE TDD system.

FIG. 6 is a diagram for an example of a structure of a radio frame in LTE TDD system. In LTE TDD system, a radio frame includes two half frames. Each of the half frames includes 4 normal subframes including 2 slots, respectively and a special subframe including DwPTS (downlink pilot time slot), GP (guard period) and UpPTS (uplink pilot time slot).

Among the special subframe, the DwPTS is used for initial cell search in a user equipment, synchronization or channel estimation. The UpPTS is used for channel estimation in a base station and uplink transmission synchronization of the user equipment. In particular, the DwPTS is used for DL transmission and the UpPTS is used for UL transmission. In particular, the UpPTS is utilized to transmit a PRACH preamble or an SRS. The guard period is a period for eliminating interference generated in uplink due to multi-path delay of a downlink signal between uplink and downlink.

Meanwhile, Table 1 in the following shows uplink/downlink subframe configuration in LTE TDD system.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D, U, and S indicate a downlink subframe, an uplink subframe, and a special subframe, respectively. And, Table 1 also shows a downlink-uplink switching period in uplink/downlink subframe configuration of each system.

Table 2 to Table 4 shows HARQ timeline of the uplink/downlink subframe configuration shown in Table 1. Table 2 shows a set of indexes of subframes in which PDSCH is transmitted. In this case, the PDSCH corresponds to HARQ transmitted in a specific uplink subframe. For example, in case of uplink/downlink subframe configuration #1, HARQ-ACK is transmitted in a subframe #2 in response to PDSCH which is received in a subframe #5 and a subframe #6.

TABLE 2

| UL/DL Configuration | 0 | 1 | 2 | 3 | 4 | 5 | 6 | 7 | 8 | 9 |
|---|---|---|---|---|---|---|---|---|---|---|
| 0 | D | S | U 6 | U | U 0 | D | S | U 1 | U | U 5 |
| 1 | D | S | U 5, 6 | U 9 | D | D | S | U 0, 1 | U 4 | D |
| 2 | D | S | U 4, 5, 6, 8 | D | D | D | S | U 0, 1, 3, 9 | D | D |
| 3 | D | S | U 1, 5, 6 | U 7, 8 | U 0, 9 | D | D | D | D | D |
| 4 | D | S | U 0, 1, 4, 5 | U 6, 7, 8, 9 | D | D | D | D | D | D |
| 5 | D | S | U 0, 1, 3, 4, 5, 6, 7, 8, 9 | D | D | D | D | D | D | D |

TABLE 2-continued

| UL/DL Configuration | 0 | 1 | 2 | 3 | 4 | 5 | 6 | 7 | 8 | 9 |
|---|---|---|---|---|---|---|---|---|---|---|
| 6 | D | S | U5 | U6 | U9 | D | S | U0 | U1 | D |

Table 3 shows indexes of subframes in which an uplink grant is transmitted. The uplink grant is scheduled by PUSCH transmitted in a specific uplink subframe. For example, in case of an uplink/downlink subframe configuration #1, PUSCH transmitted in a subframe #2 is scheduled by an uplink grant transmitted in a subframe #6. In particular, uplink/downlink subframe configuration #0 of Table 3 corresponds to a special case that the number of downlink subframes is less than the number of uplink subframes. In this case, it is able to schedule PUSCH for two uplink subframes in a single downlink subframe. It is able to indicate PUSCH of a subframe among two subframes using a UL index field of DCI (downlink control information). In particular, an indicator of the uplink index can indicate whether or not an index put in parenthesis is used, whether or not an index not put in parenthesis is used, or whether or not PUSCH is scheduled in two subframes.

TABLE 3

| UL/DL Configuration | 0 | 1 | 2 | 3 | 4 | 5 | 6 | 7 | 8 | 9 |
|---|---|---|---|---|---|---|---|---|---|---|
| 0 | D | S | U 6, (5) | U (6) | U 0 | D | S | U 1, (0) | U (1) | U 5 |
| 1 | D | S | U 6 | U 9 | D | D | S | U 1 | U 4 | D |
| 2 | D | S | U 8 | D | D | D | S | U 3 | D | D |
| 3 | D | S | U 8 | U 9 | U 0 | D | D | D | D | D |
| 4 | D | S | U 8 | U 9 | D | D | D | D | D | D |
| 5 | D | S | U 8 | D | D | D | D | D | D | D |
| 6 | D | S | U 5 | U 6 | U 9 | D | S | U 0 | U 1 | D |

Table 4 shows an index of a subframe in which PHICH is transmitted when PUSCH is transmitted in a specific uplink subframe. For example, in case of an uplink/downlink subframe configuration #1, PHICH is received in a subframe #6 in response to PUSCH transmitted in a subframe #2.

TABLE 4

| UL/DL Configuration | 0 | 1 | 2 | 3 | 4 | 5 | 6 | 7 | 8 | 9 |
|---|---|---|---|---|---|---|---|---|---|---|
| 0 | D | S | U 6 | U 0 | U 0 | D | S | U 1 | U 5 | U 5 |
| 1 | D | S | U 6 | U 9 | D | D | S | U 1 | U 4 | D |
| 2 | D | S | U 8 | D | D | D | S | U 3 | D | D |
| 3 | D | S | U 8 | U 9 | U 0 | D | D | D | D | D |
| 4 | D | S | U 8 | U 9 | D | D | D | D | D | D |
| 5 | D | S | U 8 | D | D | D | D | D | D | D |
| 6 | D | S | U 6 | U 9 | U 0 | D | S | U 1 | U 5 | D |

Figure 7:
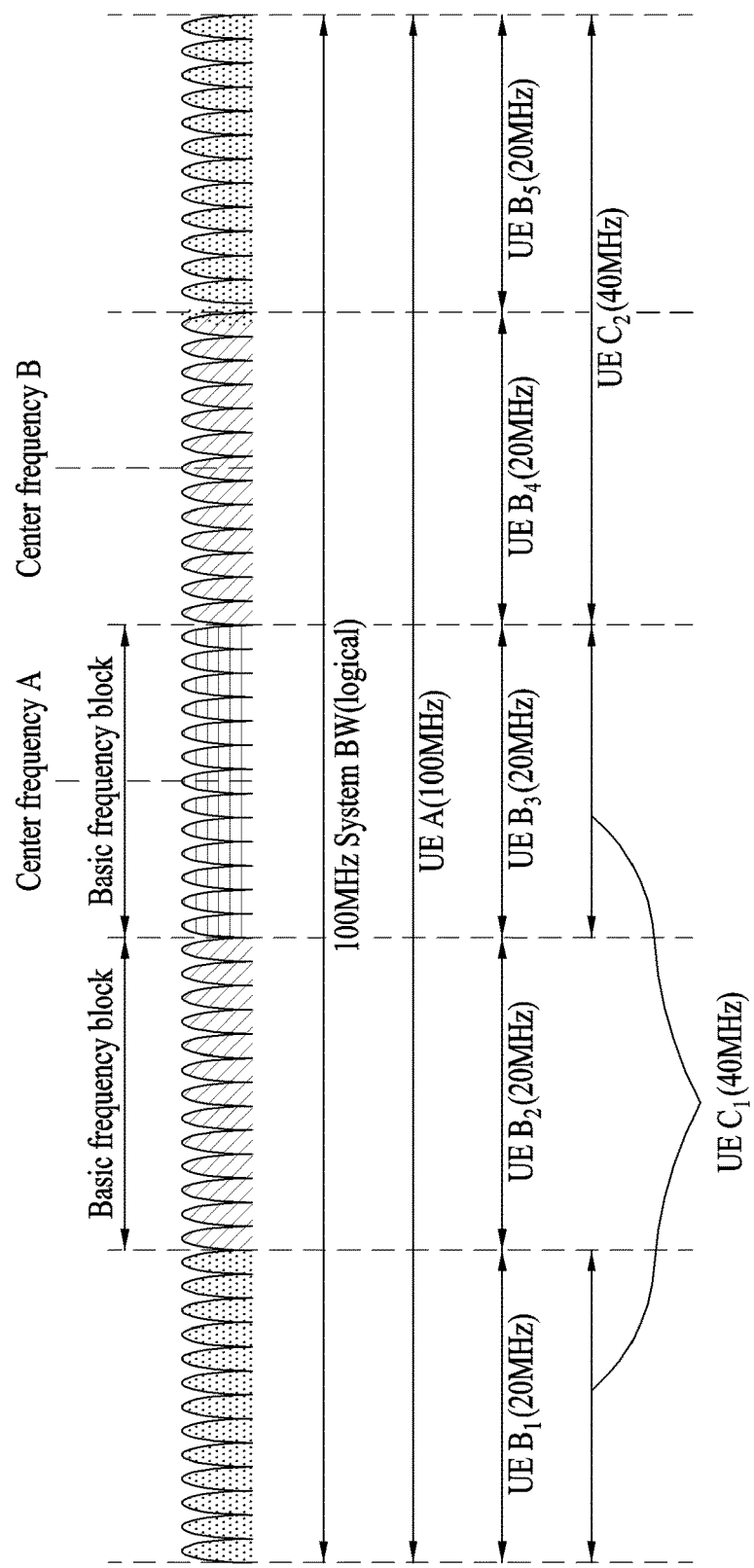
FIG. 7 is a diagram for explaining a concept of a carrier aggregation scheme.

In the following description, a carrier aggregation scheme is explained. FIG. 7 is a diagram for explaining a concept of a carrier aggregation scheme.

A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Referring to FIG. 7, a total system bandwidth (system BW) may have a system bandwidth up to maximum 100 MHz as a logical bandwidth. The total system bandwidth includes five component carriers and each of the component carriers may have up to maximum 20 MHz. The component carrier includes at least one physically contiguous subcarrier. Although each of the component carriers in FIG. 7 is depicted as including an identical bandwidth, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 7, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

In the present specification, a component carrier may correspond to a system bandwidth of a legacy system. By defining the component carrier on the basis of the legacy system, it may become easy to provide backward compatibility and to design a system in a radio communication environment in which an evolved UE and a legacy UE coexist. As an example, in case that LTE-A system supports a carrier aggregation, each of the component carriers may correspond to a system bandwidth of LTE system. In this case, the component carrier may have a prescribed bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. A UE A may use 100 MHz corresponding to the total system bandwidth and performs a communication in a manner of using all of the five component carriers. A UE $B_1$~$B_5$ can use a bandwidth of 20 MHz only and performs a communication by using one component carrier. A UE $C_1$ and a UE $C_2$ can use a bandwidth of 40 MHz and performs a communication by using two component carriers, respectively. The two component carriers may or may not be logically/physically adjacent to each other. The UE $C_1$ indicates a case that the UE $C_1$ uses two component carriers not adjacent to each other and the UE $C_2$ indicates a case that the UE $C_2$ uses two component carriers adjacent to each other.

LTE system uses one DL component carrier and one UL component carrier. On the other hand, LTE-A system may use a plurality of component carriers as depicted in FIG. 6. In this case, a scheme of scheduling a data channel, which is scheduled by a control channel, can be divided into a conventional linked carrier scheduling scheme and a cross carrier scheduling scheme.

More specifically, in case of the linked carrier scheduling scheme, similar to a legacy LTE system using a single component carrier, a control channel transmitted on a specific component carrier schedules a data channel only via the specific component carrier.

Meanwhile, in case of the cross carrier scheduling scheme, a control channel transmitted on a primary component carrier (primary CC) schedules a data channel transmitted on the primary component carrier or a different component carrier using a carrier indicator field (hereinafter abbreviated CIF).

Meanwhile, in case of applying the carrier aggregation technique in a legacy LTE-A system, when an identical frame structure type (i.e., one of FDD and TDD) and a TDD cell are aggregated, a case of configuring an identical UL-DL subframe configuration is considered only. Yet, in a recent LTE-A system, carrier aggregation is permitted to a case that UL-DL subframe configurations different from each other are configured or a case that frame structure types different from each other are applied. However, in this case, it may not be able to use scheduling timing, ACK/NACK feedback timing, retransmission timing and the like defined by a UL-DL subframe configuration as it is in each cell.

In particular, when a TDD Pcell and a FDD Scell are aggregated with each other, if ACK/NACK is transmitted via a UL subframe of the TDD Pcell in a manner that HARQ timing defined in a legacy FDD cell is applied to ACK/NACK timing transmitted in UL as it is in response to PDSCH transmitted via the FDD Scell, it is unable to transmit the ACK/NACK if the TDD Pcell is defined by a DL subframe at the ACK/NACK transmission timing. Hence, in order to provide ACK/NACK transmission to more DL subframes of the FDD Scell, it may be able to apply new HARQ timing instead of the legacy HARQ timing defined in the FDD Scell.

As a method of applying the new HARQ timing, when ACK/NACK is transmitted via the Pcell in a carrier aggregation situation of the TDD Pcell and the FDD Scell, it may be able to apply one of HARQ timings capable of being applied to a legacy TDD cell as HARQ timing of the FDD Scell. In this case, an UL-DL subframe configuration capable of applying the HARQ timing for the FDD Scell can be mainly determined by two schemes including (1) and (2) described in the following.

(1) As the HARQ timing for the FDD Scell, it may be able to apply HARQ timing of a UL-DL subframe configuration in which an UL subframe is defined by a subset of a subframe defined as a UL subframe in a UL-DL subframe configuration designated in the TDD Pcell.

For example, when the TDD Pcell is configured by a UL-DL subframe configuration #3, the HARQ timing capable of being applied to the FDD Scell becomes a UL-DL subframe configuration #3, #4, and #5. In particular, subframes except the subframe #2, #3 and #4 defined as UL subframes in the UL-DL subframe configuration #3 are unable to be applied to UL-DL subframe configuration #0, #1, #2 and #6 defined as UL subframes. By doing so, ACK/NACK transmission timing is defined only when the Pcell corresponds to a UL subframe.

(2) As the HARQ timing for the FDD Scell, it may be able to define that any HARQ timing defined in a UL-DL subframe configuration can be applied as the HARQ timing for the FDD Scell irrespective of a UL-DL subframe configuration of the TDD Pcell. In this case, since it is unable to practically transmit ACK/NACK feedback defined to be transmitted in a subframe, which is not defined as UL in the TDD Pcell, it is necessary to put a limit in a manner that PDCCH/PDSCH requiring ACK/NACK feedback is not scheduled in a DL subframe of the FDD Scell corresponding to the subframe, transmission and reception are performed without retransmitting HARQ, and the like.

In the HARQ timing scheme (1) or (2), if UL-DL subframe configuration of the TDD Pcell corresponds to #0, although a subframe #3 and a subframe #8 are defined as UL subframes in a single operation of the TDD Pcell, the subframes are not used for transmitting ACK/NACK. Hence, a resource for transmitting ACK/NACK is not defined for the subframe #3 and the #8 or a power control command may not be applied to ACK/NACK PUCCH transmitted via the subframe #3 and the #8. Hence, in the HARQ timing scheme (1) or (2), if UL-DL subframe configuration of the TDD Pcell corresponds to the UL-DL subframe configuration #0, although the subframe #3 and the #8 are designated as ACK/HARQ feedback timing at HARQ timing applied to the FDD Scell, it is preferable not to transmit ACK/NACK feedback in the subframe #3 and the #8. In this case, a UE may not receive DL-SCH carrying PDSCH requiring ACK/NACK feedback or PDCCH for scheduling the PDSCH in a DL subframe configured to receive ACK/NACK feedback in the subframe #3 and the #8. Or, the UE does not perform a HARQ operation carrying physical layer ACK/NACK in the subframe and receives PDSCH. In particular, in case of the HARQ timing scheme (1), if UL-DL subframe configuration of the TDD Pcell corresponds to #0, a UL-DL subframe configuration capable of applying HARQ timing to the FDD Scell can be restricted to UL-DL subframe #0, #2, and #5. In particular, the UL-DL subframe configuration capable of applying HARQ timing to the FDD Scell can be restricted to UL-DL subframe configuration in which ACK/NACK transmission is not designated by a subframe #3 and #8.

Meanwhile, when an eNB performs a duplex operation by dividing all available resources into a downlink resource and an uplink resource, a discussion on a technology of more flexibly changing an operation of selecting a usage of each resource from among a downlink resource and a uplink resource is in progress in a recent wireless communication system.

The dynamic resource usage change has a merit in that optimized resource distribution can be performed all the time in a situation that a size of DL traffic and a size of UL traffic are dynamically changing. For example, when a FDD system is managed in a manner of dividing a frequency band into a downlink band and an uplink band, an eNB can indicate whether a specific band corresponds to a downlink resource or an uplink resource via RRC, MAC layer, or a physical layer signal at specific timing to dynamically change a resource usage.

In particular, a TDD system divides all subframes into an uplink subframe and a downlink subframe and uses the uplink subframe and the downlink subframe for uplink transmission of a UE and downlink transmission of an eNB, respectively. In general, the resource division can be given as a part of system information according to the UL/DL subframe configuration shown in Table 1. Of course, a new UL/DL subframe configuration can be additionally provided as well as the UL/DL subframe configuration shown in Table 1. In the TDD system, an eNB can indicate whether a specific subframe corresponds to a downlink resource or an uplink resource via RRC layer, MAC layer, or a physical layer signal at specific timing to dynamically change a resource usage. In particular, a usage change message can be referred to as a reconfiguration message. The reconfiguration message can be signaled via RRC layer, MAC layer or a physical layer signal in a predefined cell (e.g., Pcell). And, the usage change message may have a UE-specific property, a cell-specific property, or a UE-group-specific property (or a UE-group-common property). In addition, the usage change message can be transmitted via a USS (UE-specific search space) or a CSS (common search space) in a predefined cell.

In a legacy LTE system, a downlink resource and an uplink resource are designated via system information. Since the system information is transmitted to a plurality of unspecified UEs, if the system information is dynamically changed, a problem may occur in operations of legacy UEs. Hence, it is preferable to deliver information on a dynamic resource usage change to UEs currently maintaining a connection with an eNB via new signaling, i.e., UE-specific signaling instead of the system information. The new signaling may indicate a configuration of a dynamically changed resource, e.g., UL/DL subframe configuration information different from information indicated by the system information in a TDD system.

In addition, the new signaling can include information related to HARQ. In particular, if a scheduling message, PUSCH/PUSCH transmission timing corresponding to the scheduling message and HARQ timing defined by HARQ-ACK transmission timing in response to the PUSCH/PUSCH transmission timing are dynamically changed, in order to solve a problem that HARQ timing is not continuous between timing changes, the new signaling can include HARQ timing configuration information capable of maintaining stable HARQ timing in case that a resource configuration is dynamically changed. In case of a TDD system, the HARQ timing configuration information can be configured by UL/DL subframe configuration, which is referred when DL HARQ timing and/or UL HARQ timing is defined.

According to the foregoing description, having accessed a system in which a resource usage is dynamically changing, a UE receives various informations on a resource configuration. In particular, in case of a TDD system, a UE can receive information described in the following at specific timing.

1) System information (UL/DL subframe configuration indicated by SIB1 (system information block type 1)) (hereinafter, SIB1 UL/DL subframe configuration).

Yet, in case of Scell, the UL/DL subframe configuration is provided via RRC signaling (specifically, RadioResourceConfigCommonS Cell IE) instead of the system information. For clarity, the RRC signaling is also referred to as the SIB1 UL/DL subframe configuration in the following.

2) UL/DL subframe configuration (hereinafter, actual UL/DL subframe configuration or valid UL/DL configuration) delivered to indicate usage of each subframe via separate signaling 3) DL HARQ timing, i.e., UL/DL subframe configuration (hereinafter, DL HARQ reference subframe configuration) delivered to define timing of transmitting HARQ-ACK in response to PDSCH received at specific timing 4) UL HARQ timing, i.e., UL/DL subframe configuration (hereinafter, UL HARQ reference subframe configuration) delivered to define timing of transmitting PUSCH in response to UL grant received at specific timing and timing of receiving PHICH in response to PUSCH transmitted at specific timing.

If a specific UE accesses an eNB dynamically changing a usage of a resource, the eNB may designate UL/DL subframe configuration in which many UL subframes are included via the system information. This is because there is a restriction on dynamically changing a subframe configured as a DL subframe to an UL subframe in the SIB1 UL/DL subframe configuration. For example, since legacy UEs always expects and measures transmission of a CRS in a subframe designated as a DL subframe via the SIB1 DL/UL subframe configuration, if the subframe is dynamically changed into an UL subframe, a huge error may occur in measuring a CRS by the legacy UEs. Hence, while the eNB configures many UL subframes in the SIB1 UL/DL subframe configuration, if DL traffic increases, it is preferable to dynamically change a part of the DL subframes into a DL subframe via the actual UL/DL subframe configuration.

In a TDD system operating based on the aforementioned principle, although a UL/DL subframe configuration #0 is indicated to a UE via the SIB1 UL/DL subframe configuration at specific timing, a UL/DL subframe configuration #1 can be indicated to the UE via the actual UL/DL subframe configuration.

And, the DL HARQ reference subframe configuration, which is a reference for DL HARQ timing, may correspond to a UL/DL subframe configuration #2. This is because, if a UL/DL subframe configuration including less UL subframe and many DL subframes becomes a reference of DL HARQ timing, a situation that it is difficult to transmit HARQ-ACK is made due to the maximum DL subframes, and the DL HARQ timing is managed according to the situation, it is able to maintain the HARQ timing although the UL/DL subframe is dynamically changed. Similarly, the UL HARQ reference subframe configuration, which is a reference for UL HARD timing, may become such a UL/DL subframe configuration including many UL subframes as a UL/DL subframe configuration #0.

In the following, a method of calculating CSI defined by a current 3GPP standard document, i.e., CQI, is explained. In general, a UE identifies a channel status using an RS (reference signal), i.e., a CSI-RS, transmitted from an eNB, selects a CQI index corresponding to an MCS (modulation and coding scheme) of which BLER (block error rate) does not exceed 10% from Table 5 in a situation that a prescribed condition defined for CQI calculation is assumed, and reports the selected CQI index to the eNB.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |

TABLE 5-continued

| CQI index | modulation | code rate × 1024 | efficiency |
|---|---|---|---|
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A procedure of calculating CQI is explained in more detail.

First of all, a UE receives a reference signal from an eNB, selects a best PMI for each rank based on a predefined PMI (precoding matrix index) codebook using the reference signal, and calculates SINR (signal to interference plus noise ratio) per layer according to the selected best PMI. And, the UE calculates SINR per codeword based on the SINR per layer and a codeword to layer mapping rule.

Subsequently, spectral efficiency (SE) satisfying BLER (block error rate) 10% is calculated from each of the SINR per codeword and throughput per codeword is calculated using $N_{RE}$ corresponding to the number of resource elements available in PDSCH and the SE.

And, sum of throughput per each rank is calculated based on the throughput per codeword and a biggest throughput and a rank corresponding to the biggest throughput are selected. In particular, an RI is determined. And, values resulted from multiplying the SE by $N_{RE}$ of PDSCH and the biggest throughput are compared with each other in CQI table of Table 5 and a closest CQI is reported to the eNB.

Meanwhile, LTE system defines such an assumption on a reference resource for measuring CQI as Table 6 in the following. In particular, the assumption includes an assumption on the $N_{RE}$ of PDSCH necessary for the procedure of calculating the CQI. In this case, it is assumed that the reference resource corresponds to a resource region to which the CQI is applied. The UE receives one or more reference signals from the eNB and measures CQI based on the one or more reference signals. In this case, assume that PDSCH corresponding to the CQI is transmitted under an assumption shown in Table 6 in the following. Yet, in this case, it is required that the reference resource corresponds to a DL subframe available for measuring CSI. In LTE system, as shown in Table 7 in the following, a valid subframe (valid CSI measurement subframe) used for measuring CSI (channel status information) is defined.

TABLE 6

The first 3 OFDM symbols are occupied by control signaling
No resource elements used by primary or secondary synchronization signals or PBCH
CP length of the non-MBSFN subframes
Redundancy Version 0
If CSI-RS is used for channel measurements, the ratio of PDSCH EPRE to CSI-RS EPRE is as given by higher layer signaling
For transmission mode 9 CSI reporting:
 CRS REs are as in non-MBSFN subframes;
 If the UE is configured for PMI/RI reporting, the UE-specific reference signal overhead is consistent with the most recent reported rank; and PDSCH signals on antenna ports {7 ... 6 + υ} for υ layers would result in signals equivalent to corresponding symbols transmitted on antenna ports $$\{15 \ldots 14 + P\}, \text{ as given by } \begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix}, \text{ where}$$

TABLE 6-continued $x(i) = [x^{(0)}(i) \ldots x^{(\upsilon-1)}(i)]^T$ is a vector of symbols from the layer mapping, $P \in \{1, 2, 4, 8\}$ is the number of CSI-RS ports configured, and if only one CSI-RS port is configured, W(i) is 1, otherwise W(i) is the precoding matrix corresponding to the reported PMI applicable to x(i). The corresponding PDSCH signals transmitted on antenna ports {15 ... 14 + P} would have a ratio of EPRE to CSI-RS EPRE equal to the ratio given by higher layer signaling.
Assume no REs allocated for CSI-RS and zero-power CSI-RS
Assume no REs allocated for PRS
The PDSCH transmission scheme depending on the transmission mode currently configured for the UE (which may be the default mode).
If CRS is used for channel measurements, the ratio of PDSCH EPRE to cell-specific RS EPRE is as given by higher layer signaling with the exception of $\rho_A$ which shall be assumed to be
 $\rho_A = P_A + \Delta_{offset} + 10\log_{10}(2)$ [dB] for any modulation scheme, if the UE is configured with transmission mode 2 with 4 cell-specific antenna ports, or transmission mode 3 with 4 cell-specific antenna ports and the associated RI is equal to one;
 $\rho_A = P_A + \Delta_{offset}$ [dB] for any modulation scheme and any number of layers, otherwise.
The shift $\Delta_{offset}$ is given by the parameter nomPDSCH-RS-EPRE-Offset which is configured by higher-layer signaling.

TABLE 7

In case multiple cells with different uplink-downlink configurations are aggregated and the UE is not capable of simultaneous reception and transmission in the aggregated cells, the following constraints apply:
 If the subframe in the primary cell is a downlink subframe, the UE shall not transmit any signal or channel on a secondary cell in the same subframe
 If the subframe in the primary cell is an uplink subframe, the UE is not expected to receive any downlink transmissions on a secondary cell in the same subframe
 If the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.
A downlink subframe in a serving cell shall be considered to be valid if:
 it is configured as a downlink subframe for that UE, and
 in case multiple cells with different uplink-downlink configurations are aggregated and the UE is not capable of simultaneous reception and transmission in the aggregated cells, the subframe in the primary cell is a downlink subframe or a special subframe with the length of DwPTS more than $7680 \cdot T_s$, and
 except for transmission mode 9 or 10, it is not an MBSFN subframe, and
 it does not contain a DwPTS field in case the length of DwPTS is $7680 \cdot T_s$ and less, and
 it does not fall within a configured measurement gap for that UE, and for periodic CSI reporting, it is an element of the CSI subframe set linked to the periodic CSI report when that UE is configured with CSI subframe sets, and
for a UE configured in transmission mode 10 with multiple configured CSI processes, and aperiodic CSI reporting for a CSI process, it is an element of the CSI subframe set linked to the downlink subframe with the corresponding CSI request in an uplink DCI format, when that UE is configured with CSI subframe sets for the CSI process.

For example, a first assumption of Table 6 is to assume that PDSCH is not transmitted to first 3 OFDM symbols in a single subframe when CQI is calculated. Since PDSCH may vary according to a subframe, this means that a UE, which is unable to know the number of PDCCH symbols of a subframe to which the CQI is applied, calculates the CQI by assuming the maximum number of symbols in which PDCCH is transmittable.

Having received the calculated CQI, the eNB adds a separate compensation value to the CQI to make the CQI to be appropriate for a configuration (e.g., number of PDCCH symbols of a subframe to which the CQI is applied) actually applied to DL transmission corresponding to the CQI and may be then able to determine a DL transport block size and the like.

When a usage of a radio resource in a specific cell (hereinafter, this cell is referred to as an eIMTA cell in the following) is dynamically changing according to a load state in a situation to which a carrier aggregation scheme (CA) is applied, the present invention proposes a method of efficiently defining a valid subframe (valid CSI measurement subframe) used for measuring channel status information.

If a UE fails to receive a usage change message (reconfiguration message) related to a cell (i.e., eIMTA cell) to which a dynamic change of a radio resource usage is applied, as shown in Table 8, it may be able to define a rule to perform a channel measurement (CSI measurement) operation and/or a DL control channel (PDCCH) monitoring operation and/or DL data channel (PDSCH) receiving operation and/or UL data channel (PUSCH) transmitting operation and the like based on the SIB1 UL/DL subframe configuration in the cell.

TABLE 8

CSI Measurement Operation

When a UE decodes explicit L1 signaling of reconfiguration correctly and detects a valid UL-DL configuration, the UE shall measure CSI only within the subframes indicated as DL subframe or special subframe by the explicit L1 signaling of reconfiguration.
If UE does not detect L1 signaling conveying a valid UL-DL configuration for a radio frame, the UE shall measure CSI only within the subframes indicated as DL subframe or special subframe by SIB configuration.

PDCCH (and/or PDSCH) Monitoring (or Reception) Operation

If UE detects L1 signaling conveying a valid UL-DL configuration for a radio frame,
    UE shall monitor the non-DRX DL subframes or special subframes indicated by explicit L1 signaling.
If UE does not detect L1 signaling conveying a valid UL-DL configuration for a radio frame,
    UE shall monitor the non-DRX DL subframes or special subframes for PDCCH or EPDCCH as indicated by SIB-1 configuration.

Valid UL-DL Configuration Determination

DL HARQ reference configuration can choose from Rel-8 TDD UL-DL configurations {2, 4, 5}.
For UE configured with TDD eIMTA, uplink scheduling timing and HARQ timing follow UL-DL configuration signaled in SIB1.
For valid UL & DL reference configurations:
    The set of UL subframes of the DL HARQ reference configuration should be a subset of the UL subframes of the UL HARQ reference UL/DL configuration.
For validity of UL/DL configuration in a reconfiguration DCI under any valid UL & DL HARQ reference configurations:
    The UE should not expect any subframe configured as UL subframe or special subframe in DL HARQ reference configuration is dynamically used as a DL subframe.
    The UE should not expect any subframe configured as DL subframe or special subframe in UL HARQ reference configuration is dynamically used as a UL subframe.

UL Grant Validation

Under fallback, if the UE receives a UL grant corresponding to at least one UL subframe per SIB1 not in the set of UL subframes per DL HARQ reference configuration, the UE still treats it as a valid grant.
Under fallback, if the UE receives a NAK in PHICH triggering PUSCH transmission in a UL subframe per SIB1 not in the set of UL subframes per DL HARQ reference configuration, the UE transmits PUSCH.

TABLE 8-continued

SRS Transmission Validation

For type 1 SRS, the determination of the subframe where the type 1 SRS is due for transmission when triggered is based on SIB1.
For both type 0 and type 1 SRS, SRS transmissions can be configured in a UL subframe or UpPTS based on SIB1.
    If a UE detects L1 signaling conveying a valid UL-DL configuration for radio frame(s), and if the UL subframe or UpPTS for SRS transmission is changed to DL subframe, the UE shall drop the SRS transmission.
    If a UE does not detect L1 signaling conveying a valid UL-DL configuration for radio frame(s),
The UE still transmits the type 1 SRS in uplink subframes and special subframes indicated based on SIB1, but the UE shall drop the type 0 SRS transmission in a subframe not indicated as UL subframe or UpPTS by the DL-HARQ reference configuration if there is no PUSCH transmission in the same subframe.

The operations of the UE may be referred to as a fallback operation or a fallback mode. Through the fallback operation of the UE, it may be able to minimize an impact of interference generated by a false operation (e.g., wrong UL data channel (PUSCH)/UL control channel (PUCCH) transmission) of the UE, which have failed to receive the usage change message, affecting communication between a different UE and the eNB or communication between a legacy UE and the eNB. Or, it may be able to minimize a DL HARQ buffer management error of the UE, which have failed to receive the usage change message.

According to a current 3GPP standard document, as shown in Table 7, when cells to which a different UL/DL subframe configuration is set are used by a carrier aggregation technique and a UE is unable to perform simultaneous reception (RX) and transmission (TX) operation in the cells, it is defined as a transmission/reception operation of an UL/DL signal is to be performed based on a prescribed constraint and a valid subframe used for measuring channel state information is to be determined based on the prescribed constraint.

In particular, when a valid subframe used for measuring channel state information is determined, if cells to which a different UL/DL subframe configuration is set are used by a carrier aggregation technique and a UE is unable to perform simultaneous reception (RX) and transmission (TX) operation in the cells, it is defined as a valid subframe of the Scell should be a DL subframe in the Pcell or DwPTS of a size equal to or greater than $7680*T_s$.

In the following, for clarity, although a situation that two cells are used with a carrier aggregation technique is assumed, it is apparent that the present invention is extensively applied to a case that three or more cells are used with the carrier aggregation technique.

<Embodiment 1>

Embodiment 1 of the present invention assumes a case that a TDD Pcell and a FDD Scell (i.e., a FDD UL CC and a FDD DL CC) are used by a carrier aggregation technique and a valid CSI measurement subframe is defined in the FDD Scell. In this case, a rule proposed in the following can be restrictively applied only when a TDD Pcell-related band and a FDD DL CC-related band are adjacent to each other and/or the TDD Pcell-related band and the FDD DL CC-related band are adjacent to each other as much as equal to or less than a threshold value. In this case, a DL signal transmitted on the DL CC of the FDD Scell and an UL signal transmitted to the TDD Pcell can mutually affect with each other as interference. This is because an UL signal transmitted on a UL CC of the FDD Scell and a DL signal to the TDD Pcell can mutually affect with each other as interference. Consequently, it can be considered as a case identical to the case that a carrier aggregation technique is used and a UE is unable to perform simultaneous reception (RX) and transmission (TX) operation in the cells 1) First of all, assume a case that a TDD eIMTA Pcell and a FDD Scell are used by a carrier aggregation technique.

As an example, if the TDD eIMTA Pcell is managed in a non-fallback mode (i.e., by applying the actual UL/DL subframe configuration or the valid UL/DL subframe configuration), subframes of the FDD Scell (i.e., subframes on FDD DL CC), which are matched with a DL subframe position and/or a special subframe position of the actual UL/DL subframe configuration of the TDD eIMTA Pcell (and/or the DL HARQ reference subframe configuration and/or the UL HARQ reference subframe configuration and/or the SIB1 UL/DL subframe configuration and/or the UL reference HARQ timeline and/or the DL reference HARQ timeline), can be defined as a valid CSI measurement subframe only. Or, subframes (on a FDD DL CC) of the UL reference HARQ timeline and/or the DL reference HARQ timeline defined for the FDD Scell can be defined as a valid CSI measurement subframe only irrespective of a TDD eIMTA Pcell-related UL/DL subframe configuration.

As a different example, if the TDD eIMTA Pcell is managed in a fallback mode (i.e., by applying the SIB1 UL/DL subframe configuration), subframes of the FDD Scell (i.e., subframes on FDD DL CC), which are matched with a DL subframe position and/or a special subframe position of the SIB1 UL/DL subframe configuration of the TDD eIMTA Pcell (and/or the DL HARQ reference subframe configuration and/or the UL HARQ reference subframe configuration and/or the UL reference HARQ timeline and/or the DL reference HARQ timeline), can be defined as a valid CSI measurement subframe only. Or, subframes (on a FDD DL CC) of the UL reference HARQ timeline and/or the DL reference HARQ timeline defined for the FDD Scell can be defined as a valid CSI measurement subframe only irrespective of a TDD eIMTA Pcell-related UL/DL subframe configuration.

Or, if a position of a valid CSI measurement subframe interlocked with a CSI report of a FDD DL CC-related specific timing is overlapped with a region in which the TDD eIMTA Pcell operates in a fall back mode, the CSI report can be omitted or the CSI report can be performed using a predefined specific value (e.g., an RI indicating rank 1, PMI, PTI, or CQI (e.g., OOR (out of range))). Or, the CSI report can be performed again using a previously reported CSI value based on a valid CSI measurement subframe of a region overlapped with a region in which the TDD eIMTA Pcell most recently operates in the non-fallback mode.

2) Secondly, assume a case that a TDD non-eIMTA Pcell and a FDD Scell are used by a carrier aggregation technique.

In this case, subframes of the FDD Scell (i.e., subframes on FDD DL CC), which are matched with a DL subframe position and/or a special subframe position of the SIB1 UL/DL subframe configuration of the TDD non-eIMTA Pcell (and/or the UL reference HARQ timeline and/or the DL reference HARQ timeline), can be defined as a valid CSI measurement subframe only. Or, subframes (on a FDD DL CC) of the UL reference HARQ timeline and/or the DL reference HARQ timeline defined for the FDD Scell can be defined as a valid CSI measurement subframe only irrespective of a TDD non-eIMTA Pcell-related UL/DL subframe configuration.

3) It is able to assume that valid CSI measurement subframe candidates interlocked with a CSI report of FDD DL CC (i.e., FDD Scell)-related specific timing exist in a predetermined (or signaled in advance) section (window of valid CSI reference resource) only. In this case, the valid CSI measurement subframe candidates interlocked with a CSI report of the specific timing in the predetermined section can be defined by one of the aforementioned schemes.

And, if the valid CSI measurement subframe candidates interlocked with the CSI report of the specific timing do not exist in the predetermined section, the CSI report can be omitted or the CSI report can be performed using a predefined specific value. Or, the CSI report can be performed again using a previously reported CSI value based on a valid CSI measurement subframe existing in a most recently configured section (or a section signaled in advance).

Figure 8:
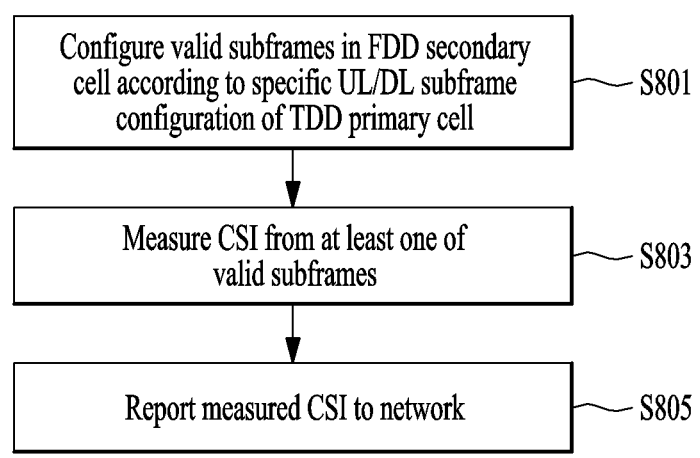
FIG. 8 is a flowchart for a method of reporting CSI according to embodiments of the present invention.

FIG. 8 is a flowchart for a method of reporting CSI according to embodiments of the present invention. In particular, FIG. 8 assumes a case that a TDD Pcell and a FDD Scell are aggregated with each other.

Referring to FIG. 8, in the step S801, a UE configures subframes valid in the FDD Scell. More specifically, the UE configures subframes of the FDD Scell, which are matched with positions of DL subframes of a specific UL/DL subframe configuration of the TDD Pcell or positions of special subframes including a DL resource of a length longer than a predetermined length, as subframes valid for measuring the CSI. Preferably, the specific UL/DL subframe configuration may correspond to SIB1 UL/DL subframe configuration irrespective of whether or not the TDD Pcell corresponds to an eIMTA cell and whether or not the TDD Pcell operates in a fallback mode. This is because the number of DL subframes indicated by the SIB1 UL/DL subframe configuration corresponds to a minimum value compared to the number of DL subframes indicated by other UL/DL subframe configuration (e.g., actual UL/DL subframe configuration, DL HARQ subframe configuration and the like).

Subsequently, in the step S803, the UE measures the CSI in at least one valid subframe among the valid subframes. In the step S805, the UE reports the measure CSI to a network.

<Embodiment 2>

Embodiment 2 of the present invention defines a valid CSI measurement subframe in a TDD SCell in a manner of assuming a case that a FDD PCell (i.e., FDD UL CC and FDD DL CC) and a TDD SCell are used with a carrier aggregation technique. In this case, a rule proposed in the following can be restrictively applied to a case that a FDD DL CC-related band and a TDD SCell-related band are adjacent to each other as much as equal to or less than a threshold value. This is because a downlink signal transmitted on a DL CC of the FDD PCell and an uplink signal transmitted to the TDD SCell can mutually affect with each other as interference and the case may correspond to a case that a UE is unable to perform simultaneous transmission and reception in cells aggregated with each other.

1) First of all, assume a case that a FDD Pcell and a TDD eIMTA Scell are used by a carrier aggregation technique.

As an example, if the TDD eIMTA Scell is managed in a non-fallback mode (i.e., by applying the actual UL/DL subframe configuration or the valid UL/DL subframe configuration), a downlink subframe and/or special subframes of the actual UL/DL subframe configuration (and/or the DL HARQ reference subframe configuration and/or the UL HARQ reference subframe configuration and/or the SIB1 UL/DL subframe configuration and/or the UL reference HARQ timeline and/or the DL reference HARQ timeline) of the TDD eIMTA SCell can be defined as a valid CSI measurement subframe only.

As a different example, if the TDD eIMTA Scell is managed in a fallback mode (i.e., by applying the SIB1

UL/DL subframe configuration), a DL subframe and/or special subframes of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA Scell can be defined as a valid CSI measurement subframe only. Or, if a position of a valid CSI measurement subframe interlocked with a CSI report of a TDD eIMTA Scell-related specific timing is overlapped with a region in which the TDD eIMTA Scell operates in a fall back mode, the CSI report can be omitted or the CSI report can be performed using a predefined specific value. Or, the CSI report can be performed again using a previously reported (TDD eIMTA Scell-related) CSI value based on a valid CSI measurement subframe of a position overlapped with a region in which the TDD eIMTA Scell most recently operates in the non-fallback mode.

2) Secondly, assume a case that a FDD Scell and a TDD non-eIMTA Scell and are used by a carrier aggregation technique. In this case, a downlink subframe and/or special subframes of the SIB1 UL/DL subframe configuration (and/or the UL reference HARQ timeline and/or the DL reference HARQ timeline) of the TDD non-eIMTA Scell can be defined as a valid CSI measurement subframe only.

3) It is able to assume that valid CSI measurement subframe candidates interlocked with a CSI report of TDD (eIMTA/non-eIMTA) Scell-related specific timing exist in a predetermined (or signaled in advance) section only. In this case, the valid CSI measurement subframe candidates, which are interlocked with the CSI report of the specific timing in the predetermined section, can be defined by one of the aforementioned schemes.

And, if the valid CSI measurement subframe candidates interlocked with the CSI report of the specific timing do not exist in the predetermined section, the CSI report can be omitted or the CSI report can be performed using a predefined specific value. Or, the CSI report can be performed again using a previously reported CSI value based on a valid CSI measurement subframe existing in a most recently configured section (or a section signaled in advance).

<Embodiment 3>

In third embodiment of the present invention, a valid CSI measurement subframe is defined in a manner of assuming a case that a FDD Pcell (i.e., FDD UL CC and FDD DL CC) and a TDD Scell are used by a carrier aggregation technique. A difference between the third embodiment and the second embodiment is to restrictively apply the third embodiment only when a FDD UL CC-related band and a TDD Scell-related band are adjacent to each other as much as equal to or less than a threshold. This is because an uplink signal transmitted on a UL CC of the FDD PCell and a downlink signal transmitted to the TDD SCell can mutually affect with each other as interference. The case may correspond to a case that a UE is unable to perform simultaneous transmission and reception in cells aggregated with each other.

1) First of all, assume a case that a FDD Pcell and a TDD eIMTA Scell are used by a carrier aggregation technique.

As an example, if a part of DL subframes of the TDD eIMTA Scell and/or special subframes are configured to be used for DL communication of the TDD eIMTA Scell via a predefined rule, physical layer signaling or higher layer signaling (hereinafter, for clarity, a set of the subframes is referred to as Available_SCellSF_Set) and the TDD eIMTA Scell is managed in a non-fallback mode (i.e., by applying the actual UL/DL subframe configuration or the valid UL/DL subframe configuration), subframes belonging to the Available_SCellSF_Set among the DL subframes and/or the special subframes of the actual UL/DL subframe configuration (and/or the DL HARQ reference subframe configuration and/or the UL HARQ reference subframe configuration and/or the SIB1 UL/DL subframe configuration and/or the UL reference HARQ timeline and/or the DL reference HARQ timeline) of the TDD eIMTA SCell can be defined as a valid CSI measurement subframe only.

And, if a part of DL subframes of the TDD eIMTA Scell and/or special subframes are configured to be used for DL communication of the TDD eIMTA Scell via a predefined rule or signaling (i.e., Available_SCellSF_Set) and the TDD eIMTA Scell is managed in a fallback mode (by applying the SIB1 UL/DL subframe configuration), subframes belonging to the Available_SCellSF_Set among the DL subframes and/or the special subframes of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA SCell can be defined as a valid CSI measurement subframe only.

In addition, if a position of a valid CSI measurement subframe interlocked with a CSI report of a TDD eIMTA Scell-related specific timing is overlapped with a region in which the TDD eIMTA Scell operates in a fall back mode, the CSI report can be omitted or the CSI report can be performed using a predefined specific value. Or, the CSI report can be performed again using a previously reported value based on a valid CSI measurement subframe of a position overlapped with a region in which the TDD eIMTA Scell most recently operates in the non-fallback mode.

2) Secondly, assume a case that a FDD Scell and a TDD non-eIMTA Scell and are used by a carrier aggregation technique. In this case, subframes belonging to the Available_SCellSF_Set among downlink subframes and/or special subframes of the SIB1 UL/DL subframe configuration (and/or the UL reference HARQ timeline and/or the DL reference HARQ timeline) of the TDD non-eIMTA Scell can be defined as a valid CSI measurement subframe only.

3) It is able to assume that valid CSI measurement subframe candidates interlocked with a CSI report of TDD (eIMTA/non-eIMTA) Scell-related specific timing exist in a predetermined (or signaled in advance) section only. In this case, the valid CSI measurement subframe candidates, which are interlocked with the CSI report of the specific timing in the predetermined section, can be defined by one of the aforementioned schemes.

As an example, if the valid CSI measurement subframe candidates interlocked with the CSI report of the specific timing do not exist in the predetermined section, the CSI report can be omitted or the CSI report can be performed using a predefined specific value. Or, the CSI report can be performed again using a previously reported CSI value based on a valid CSI measurement subframe existing in a most recently configured section (or a section signaled in advance).

<Embodiment 4>

In fourth embodiment of the present invention, a valid CSI measurement subframe of a TDD Scell is defined in a manner of assuming a case that a TDD Pcell and a TDD Scell to which a different TDD UL-DL subframe configuration is respectively set are used by a carrier aggregation technique. As mentioned in the foregoing description, a default UL/DL subframe configuration of the TDD Pcell is provided via SIB1 and a default UL/DL subframe configuration of the TDD Scell can be provided via RadioResourceConfigCommonSCell IE.

A) First of all, consider a case that a TDD non-eIMTA PCell and a TDD eIMTA Scell are aggregated with each other.

i) If the TDD eIMTA Scell is managed in a non-fallback mode (i.e., by applying the actual UL/DL subframe configuration or the valid UL/DL subframe configuration), subframes, which are matched with a DL subframe position and/or a special subframe position of the SIB1 UL/DL subframe configuration (and/or the UL reference HARQ timeline and/or the DL reference HARQ timeline) of the TDD non-eIMTA Pcell and the subframes configured to be used as DL subframe and/or special subframes of the actual UL-DL subframe configuration (and/or the DL HARQ reference subframe configuration and/or the UL HARQ reference subframe configuration and/or the SIB1 UL/DL subframe configuration and/or the UL reference HARQ timeline and/or the DL reference HARQ timeline) of the TDD eIMTA SCell, can be defined as a valid CSI measurement subframe only.

Or, subframes used as DL subframes and/or special subframes of the actual UL-DL subframe configuration (and/or the DL HARQ reference subframe configuration and/or the UL HARQ reference subframe configuration and/or the SIB1 UL/DL subframe configuration and/or the UL reference HARQ timeline and/or the DL reference HARQ timeline) of the TDD eIMTA SCell can be defined as a valid CSI measurement subframe only irrespective of a TDD non-eIMTA Pcell-related UL/DL subframe configuration.

ii) If the TDD eIMTA Scell is managed in a fallback mode (i.e., by applying the SIB1 UL/DL subframe configuration), subframes, which are matched with a DL subframe position and/or a special subframe position of the SIB1 UL/DL subframe configuration (and/or the UL reference HARQ timeline and/or the DL reference HARQ timeline) of the TDD non-eIMTA Pcell and the subframes configured to be used as DL subframe and/or special subframes of the SIB1 UL-DL subframe configuration (and/or the DL HARQ reference subframe configuration and/or the UL HARQ reference subframe configuration and/or the UL reference HARQ timeline and/or the DL reference HARQ timeline) of the TDD eIMTA SCell, can be defined as a valid CSI measurement subframe only.

Or, subframes configured to be used as DL subframes and/or special subframes of the SIB UL/DL subframe configuration (and/or the DL HARQ reference subframe configuration and/or the UL HARQ reference subframe configuration and/or the UL reference HARQ timeline and/or the DL reference HARQ timeline) of the TDD eIMTA SCell can be defined as a valid CSI measurement subframe only irrespective of a TDD non-eIMTA Pcell-related UL/DL subframe configuration.

Or, if a position of a valid CSI measurement subframe interlocked with a CSI report of TDD eIMTA SCell-related specific timing is overlapped with a region in which the TDD eIMTA Scell operates in a fall back mode, the CSI report can be omitted or the CSI report can be performed using a predefined specific value. Or, the CSI report can be performed again using a previously reported CSI value based on a valid CSI measurement subframe of a position overlapped with a region in which the TDD eIMTA Scell most recently operates in non-fallback mode.

B) Secondly, consider a case that a TDD eIMTA PCell and a TDD non-eIMTA Scell are aggregated with each other.

i) If the TDD eIMTA Pcell is managed in a non-fallback mode (i.e., by applying the actual UL/DL subframe configuration or the valid UL/DL subframe configuration), subframes, which are matched with a DL subframe position and/or a special subframe position of the actual UL/DL subframe configuration (and/or the DL HARQ reference subframe configuration and/or the UL HARQ reference subframe configuration and/or the SIB UL/DL subframe configuration and/or the UL reference HARQ timeline and/or the DL reference HARQ timeline) of the TDD eIMTA Pcell and the subframes configured to be used as DL subframes and/or special subframes of the SIB1 UL/DL subframe configuration (and/or the UL reference HARQ timeline and/or the DL reference HARQ timeline) of the TDD non-eIMTA SCell, can be defined as a valid CSI measurement subframe only.

Or, subframes used as DL subframes and/or special subframes of the SIB1 UL/DL subframe configuration (and/or the UL reference HARQ timeline and/or the DL reference HARQ timeline) of the TDD non-eIMTA SCell can be defined as a valid CSI measurement subframe only irrespective of a TDD non-eIMTA Pcell-related UL/DL subframe configuration.

ii) If the TDD eIMTA Pcell is managed in a fallback mode (i.e., by applying the SIB1 UL/DL subframe configuration or the valid UL/DL subframe configuration), subframes, which are matched with a DL subframe position and/or a special subframe position of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA Pcell and the subframes configured to be used as DL subframes and/or special subframes of the SIB1 UL/DL subframe configuration (and/or the UL reference HARQ timeline and/or the DL reference HARQ timeline) of the TDD non-eIMTA SCell, can be defined as a valid CSI measurement subframe only.

Or, subframes configured to be used as DL subframes and/or special subframes of the SIB UL/DL subframe configuration (and/or the UL reference HARQ timeline and/or the DL reference HARQ timeline) of the TDD non-eIMTA SCell can be defined as a valid CSI measurement subframe only irrespective of a TDD eIMTA Pcell-related UL/DL subframe configuration.

Similarly, if a position of a valid CSI measurement subframe interlocked with a CSI report of TDD non-eIMTA SCell-related (and/or a TDD eIMTA Pcell-related) specific timing is overlapped with a region in which the TDD eIMTA Pcell operates in a fall back mode, the CSI report can be omitted or the CSI report can be performed using a predefined specific value. Or, the CSI report can be performed again using a TDD non-eIMTA Scell-related CSI value and/or a TDD eIMTA Pcell-related CSI value based on a valid CSI measurement subframe of a position overlapped with a region in which the TDD eIMTA Pcell most recently operates in the non-fallback mode.

C) Moreover, consider a case that a TDD eIMTA PCell and a TDD eIMTA Scell are aggregated with each other.

i) If the TDD eIMTA Pcell is managed in a non-fallback mode (i.e., by applying the actual UL/DL subframe configuration or the valid UL/DL subframe configuration) and the TDD eIMTA Scell is also managed in the non-fallback mode, subframes, which are matched with a DL subframe position and/or a special subframe position of the actual UL/DL subframe configuration (and/or the DL HARQ reference subframe configuration and/or the UL HARQ reference subframe configuration and/or the SIB1 UL/DL subframe configuration and/or the UL reference HARQ timeline and/or the DL reference HARQ timeline) of the TDD eIMTA Pcell and the subframes configured to be used as DL subframes and/or special subframes of the actual UL/DL subframe configuration (and/or the DL HARQ reference subframe configuration and/or the UL HARQ reference subframe configuration and/or the SIB1 UL/DL subframe configuration and/or the UL reference HARQ timeline and/or the DL reference HARQ timeline) of the TDD eIMTA SCell, can be defined as a valid CSI measurement subframe only.

And, subframes used as DL subframes and/or special subframes of the actual UL/DL subframe configuration (and/or the DL HARQ reference subframe configuration and/or the UL HARQ reference subframe configuration and/or the SIB1 UL/DL subframe configuration and/or the UL reference HARQ timeline and/or the DL reference HARQ timeline) of the TDD eIMTA SCell can be defined as a valid CSI measurement subframe only irrespective of a TDD eIMTA Pcell-related UL/DL subframe configuration.

ii) If the TDD eIMTA Pcell is managed in a fallback mode (i.e., by applying the SIB1 UL/DL subframe configuration) and the TDD eIMTA Scell is managed in a non-fallback mode (i.e., by applying the actual UL/DL subframe configuration or the valid UL/DL subframe configuration), subframes, which are matched with a DL subframe position and/or a special subframe position of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA Pcell and the subframes configured to be used as DL subframes and/or special subframes of the actual UL/DL subframe configuration (and/or the DL HARQ reference subframe configuration and/or the UL HARQ reference subframe configuration and/or the SIB UL/DL subframe configuration and/or the UL reference HARQ timeline and/or the DL reference HARQ timeline) of the TDD eIMTA SCell, can be defined as a valid CSI measurement subframe only.

Or, subframes configured to be used as DL subframes and/or special subframes of the actual UL/DL subframe configuration (and/or the DL HARQ reference subframe configuration and/or the UL HARQ reference subframe configuration and/or the SIB UL/DL subframe configuration and/or the UL reference HARQ timeline and/or the DL reference HARQ timeline) of the TDD eIMTA SCell can be defined as a valid CSI measurement subframe only irrespective of a TDD eIMTA Pcell-related UL/DL subframe configuration.

iii) If the TDD eIMTA Pcell is managed in a non-fallback mode (i.e., by applying the actual UL/DL subframe configuration or the valid UL/DL subframe configuration) and the TDD eIMTA Scell is managed in a fallback mode (i.e., by applying the SIB1 UL/DL subframe configuration), subframes, which are matched with a DL subframe position and/or a special subframe position of the actual UL/DL subframe configuration (and/or the DL HARQ reference subframe configuration and/or the UL HARQ reference subframe configuration and/or the SIB UL/DL subframe configuration and/or the UL reference HARQ timeline and/or the DL reference HARQ timeline) of the TDD eIMTA Pcell and the subframes configured to be used as DL subframes and/or special subframes of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA SCell, can be defined as a valid CSI measurement subframe only.

And, subframes configured to be used as DL subframes and/or special subframes of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA SCell can be defined as a valid CSI measurement subframe only irrespective of a TDD eIMTA Pcell-related UL/DL subframe configuration.

iv) If the TDD eIMTA Pcell is managed in a fallback mode (i.e., by applying the SIB1 UL/DL subframe configuration) and the TDD eIMTA Scell is also managed in the fallback mode, subframes, which are matched with a DL subframe position and/or a special subframe position of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA Pcell and the subframes configured to be used as DL subframes and/or special subframes of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA S Cell, can be defined as a valid CSI measurement subframe only.

Or, subframes configured to be used as DL subframes and/or special subframes of the SIB1 UL/DL subframe configuration (and/or the DL HARQ reference subframe configuration and/or the UL HARQ reference subframe configuration and/or the UL reference HARQ timeline and/or the DL reference HARQ timeline) of the TDD eIMTA SCell can be defined as a valid CSI measurement subframe only irrespective of a TDD eIMTA Pcell-related UL/DL subframe configuration.

Moreover, if a position of a valid CSI measurement subframe interlocked with a CSI report of TDD eIMTA SCell-related (and/or a TDD eIMTA Pcell-related) specific timing is overlapped with a region in which the TDD eIMTA Scell (and/or the TDD eIMTA Pcell) operates in a fall back mode, the CSI report can be omitted or the CSI report can be performed using a predefined specific value. Or, the CSI report can be performed again using a TDD eIMTA Scell-related CSI value and/or a TDD eIMTA Pcell-related CSI value based on a valid CSI measurement subframe of a position overlapped with a region in which the TDD eIMTA Scell (and/or the TDD eIMTA Pcell) most recently operates in the non-fallback mode.

D) Lastly, consider a case that a TDD non-eIMTA PCell and a TDD non-eIMTA Scell are aggregated with each other. In this case, subframes, which are matched with a DL subframe position and/or a special subframe position of the SIB1 UL/DL subframe configuration (and/or the UL reference HARQ timeline and/or the DL reference HARQ timeline) of the TDD eIMTA Pcell and the subframes configured to be used as DL subframes and/or special subframes of the SIB1 UL/DL subframe configuration (and/or the UL reference HARQ timeline and/or the DL reference HARQ timeline) of the TDD eIMTA SCell, can be defined as a valid CSI measurement subframe only.

E) Additionally, it may be able to define a rule that valid CSI measurement subframe candidates interlocked with a CSI report of specific timing related to the TDD (eIMTA/non-eIMTA) Scell (and/or the TDD (eIMTA/non-eIMTA)

Pcell) exist in a predetermined (signaled in advance) section only. In this case, as an example, the valid CSI measurement subframe candidates interlocked with the CSI report of the specific timing in the predetermined section can be defined by one of the A) to D). If the valid CSI measurement subframe candidates interlocked with the CSI report of the specific timing in the section do not exist, the CSI report can be omitted or the CSI report can be performed using a predefined specific value. Or, the CSI report can be performed again using a previously reported CSI value based on a valid CSI measurement subframe existing in a most recently preconfigured section.

It may be able to define a rule that the aforementioned proposed schemes are restrictively applied only when a radio resource usage of at least one specific cell is dynamically changed according to a load state (and/or when a transmission mode of at least one specific cell is designated by a predefined transmission mode and/or when UL-DL configuration (UL-DL subframe configuration) of at least one specific cell is (re)configured by a specific value) in a situation to which a carrier aggregation technique is applied. And, the aforementioned proposed schemes can be defined to be restrictively applied to a periodic channel state information (P-CSI) reporting-related operation (and/or an aperiodic channel state information (A-CS I) reporting-related operation) only.

In addition, a valid CSI measurement subframe of the FDD Pcell can be defined by DL subframes on a FDD DL CC (i.e., FDD Pcell) and a valid CSI measurement subframe of the TDD Pcell can be defined by a DL subframe and special subframes of the SIB1 UL-DL subframe configuration (i.e., TDD Pcell). And, a valid CSI measurement subframe of the TDD eIMTA Pcell can be defined by a DL subframe and/or special subframes of the actual UL/DL subframe configuration (and/or the DL HARQ reference subframe configuration and/or the UL HARQ reference subframe configuration and/or the SIB1 UL/DL subframe configuration and/or the UL reference HARQ timeline and/or the DL reference HARQ timeline) (in case of a non-fallback mode). Or, a valid CSI measurement subframe of the TDD eIMTA Pcell can be defined by a DL subframe and/or special subframes of the SIB1 UL/DL subframe configuration (and/or the DL HARQ reference subframe configuration and/or the UL HARQ reference subframe configuration and/or the UL reference HARQ timeline and/or the DL reference HARQ timeline) (in case of a fallback mode).

In a situation to which a carrier aggregation technique is applied, the aforementioned proposed schemes can be restrictively applied to a case that subframes of the Pcell are preferentially used compared to subframes of the Scell in terms of a UE in capable of performing simultaneous TX and RX operation in aggregated cells. In addition, the aforementioned proposed schemes can be restrictively applied to a UE in capable of performing simultaneous TX and RX operation in cells to which a carrier aggregation technique is applied. In addition, it may be able to define a rule that the present invention is restrictively applied to a DwPTS area of a specific subframe of the Pcell (or the S cell) greater than (or equal to or greater than) $7680*T_s$ only.

In the aforementioned embodiments, when a TDD (eIMTA/non-eIMTA) Pcell and a FDD Scell (and/or TDD (eIMTA/non-eIMTA) Scell) are used with a carrier aggregation technique, if the TDD (eIMTA/non-eIMTA) Pcell corresponds to a special subframe at specific timing and the FDD Scell (and/or TDD (eIMTA/non-eIMTA) Scell) corresponds to a DL subframe at the timing, it may be able to define a rule that a UE incapable of performing simultaneous TX and RX in the cells performs CRS transmission in an area corresponding to a DwPTS area of the special subframe of the TDD (eIMTA/non-eIMTA) Pcell only among DL subframe regions of the FDD Scell (and/or TDD (eIMTA/non-eIMTA) Scell).

And, a base station can inform a UE of information on the aforementioned embodiments, information on whether or not the embodiments are applied, and the like via a predefined signal (e.g., a physical layer signal or a higher layer signal). It may be able to define a rule that the aforementioned embodiments are restrictively applied to a case that a TDD cell and a FDD cell are used by a carrier aggregation technique only (e.g., a TDD (eIMTA/Non-eIMTA) Pcell and a FDD SCell or a FDD Pcell and a TDD (eIMTA/Non-eIMTA) Scell).

Additionally, according to the aforementioned embodiments, if a resource is defined as a valid CSI measurement subframe in the Scell, it may be preferable not to perform UL scheduling in the Pcell. However, if the UL scheduling is performed in the Pcell, it can be regarded as a scheduling error of the base station by putting priority on the Scell. Or, it may be able to perform one of operations based on scheduling of the base station by putting priority on the Pcell. This is explained with reference to the attached drawings.

Figure 9:
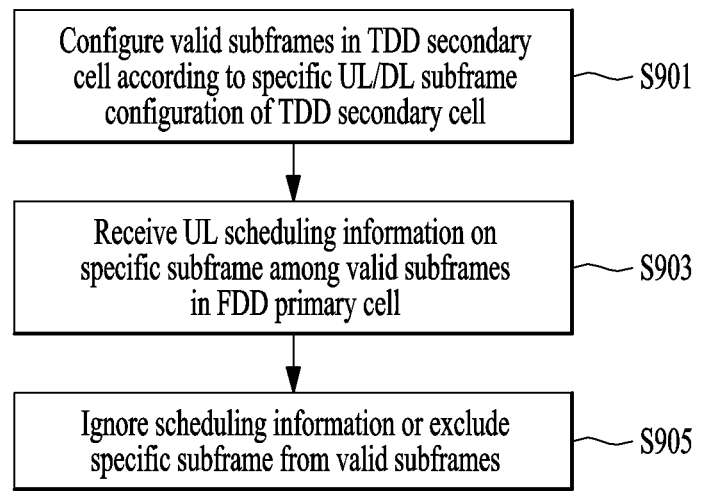
FIG. 9 is a different flowchart for a method of reporting CSI according to embodiments of the present invention.

FIG. 9 is a different flowchart for a method of reporting CSI according to embodiments of the present invention. In particular, similar to the embodiment 3 of the present invention, in FIG. 9, assume a case that FDD UL CC-related band and TDD Scell-related band are adjacent to each other as much as equal to or less than a threshold or a case that a UE is unable to perform simultaneous TX and RX operation in cells aggregated with each other.

Referring to FIG. 9, in the step S901, a UE configures valid subframes in a TDD Scell according to a specific UL/DL subframe configuration of the TDD Scell. Subsequently, as shown in the step S903, the UE can receive UL scheduling information in a FDD Pcell from a network in response to a specific subframe among the valid subframes.

In this case, according to the present invention, as shown in the step S905, the UE can ignore the scheduling information or the UE can exclude the specific frame from the valid subframes.

Figure 10:
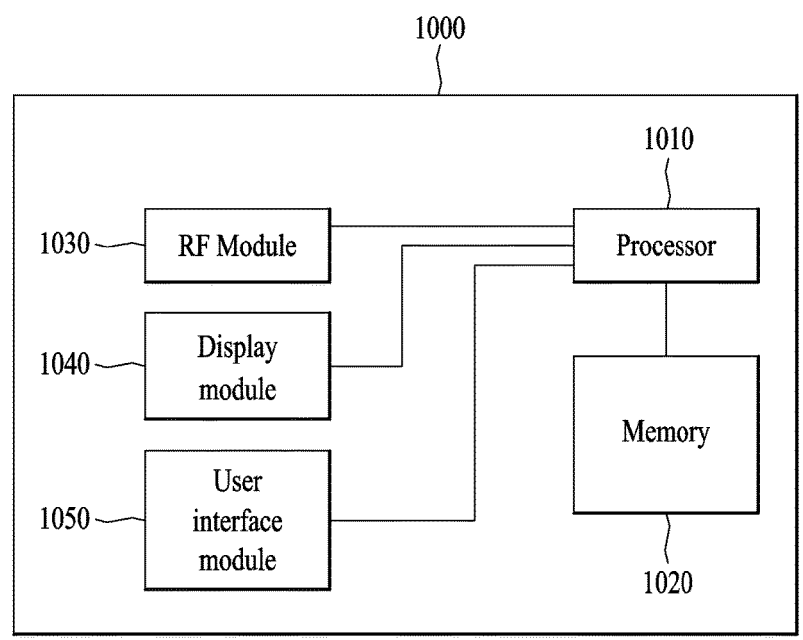
FIG. 10 is a block diagram for an example of a communication device according to one embodiment of the present invention.

FIG. 10 is a block diagram for an example of a communication device according to one embodiment of the present invention.

Referring to FIG. 10, a communication device 1000 includes a processor 1010, a memory 1020, an RF module 1030, a display module 1040, and a user interface module 1050.

The communication device 1000 is depicted for clarity. A part of the modules can be omitted. And, the communication device can further include a necessary module. And, a part of the modules of the communication device 1000 can be divided into more segmented modules. The processor 1010 is configured to perform operations according to embodiments of the present invention shown in the drawings. Specifically, for detail operations of the processor 1010, it may refer to contents descried in FIGS. 1 to 10.

The memory 1020 is connected with the processor 1010 and stores operating system, an application, a program code, a data and the like. The RF module 1030 is connected with the processor 1010 and performs a function of converting a baseband signal into a radio signal or a function of converting a radio signal into a baseband signal. To this end, the RF module 1030 performs analog conversion, amplification, filtering, frequency up-converting, or a reverse procedure of the functions. The display module 1040 is connected with the processor 1010 and displays various informations. The display module 1040 can use such a well-known element as LCD (liquid crystal display), LED (light emitting diode), and OLED (organic light emitting diode), by which the present invention may be non-limited. the user interface module 1050 is connected with the processor 1010 and can be configured by a combination of well-known user interfaces such as a keypad, a touch screen and the like.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit is located at the interior or exterior of the processor and may transmit and receive data to and from the processor via various known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of configuring a reference resource of channel state information in a wireless communication system and an apparatus therefor are described centering on examples applied to 3GPP LTE system, it may be applicable to various wireless communication systems as well as to the 3GPP LTE system.

What is claimed is:

1. A method for reporting CSI (channel state information) on a TDD (time division duplex) secondary cell, which is reported by a user equipment (UE) in a wireless communication system to which a carrier aggregation technique is applied, the method comprising:
configuring downlink subframes of a specific uplink/downlink subframe configuration of the TDD secondary cell and special subframes having a DwPTS (downlink pilot time slot) equal to or longer than a predetermined time length of the specific uplink/downlink subframe configuration as valid subframes for measuring the CSI in the TDD secondary cell;
receiving, from a network, uplink scheduling information instructing to transmit an uplink signal through an FDD (frequency division duplex) primary cell at a specific subframe among the valid subframes, wherein the uplink scheduling information is ignored not to schedule the uplink signal for receiving a reference signal at the specific subframe;
measuring the CSI for the TDD secondary cell using the reference signal at the specific subframe; and
reporting the CSI to the network.

2. The method of claim 1, wherein the UE is unable to perform simultaneous transmission and reception in FDD the FDD primary cell and the TDD secondary cell.

3. The method of claim 1, wherein a frequency band of the FDD primary cell is adjacent to a frequency band of the TDD secondary cell within a threshold frequency value.

4. The method of claim 1, wherein the specific uplink/downlink subframe configuration corresponds to an uplink/downlink subframe configured in advance via system information or an uplink/downlink subframe configuration indicated via a physical layer.

5. The method of claim 1, further comprising detecting information on an uplink/downlink subframe configuration for dynamically changing a subframe usage in the TDD secondary cell.

6. The method of claim 5, wherein if it fails to detect information on the uplink/downlink subframe configuration, the specific uplink/downlink subframe configuration corresponds to an uplink/downlink subframe configuration configured in advance via system information.

* * * * *